Figure 1:
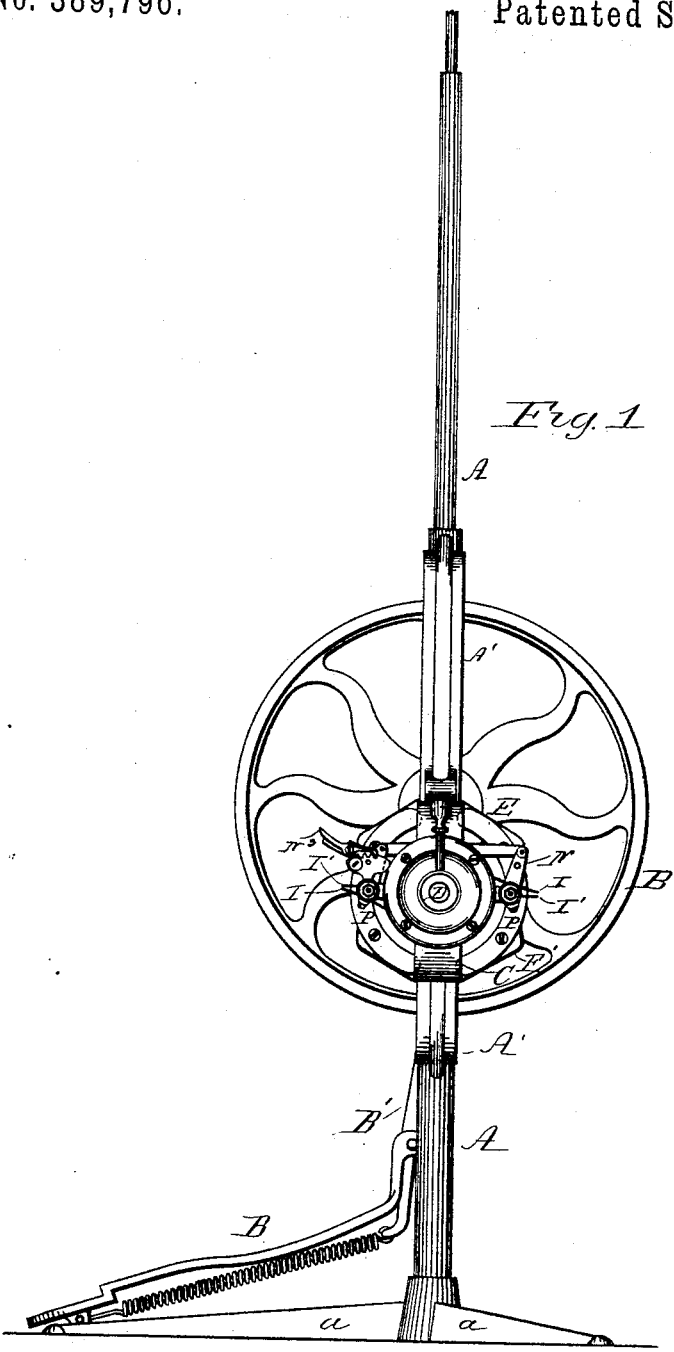

(No Model.) 3 Sheets—Sheet 1.

C. DORIOT.
DENTAL ENGINE.

No. 389,796. Patented Sept. 18, 1888.

WITNESSES
Will K. Powell.
J. B. McGuw.

INVENTOR
Constant Doriot
by Connolly Bros
Atty (No Model.) 3 Sheets—Sheet 2.
C. DORIOT.
DENTAL ENGINE.
No. 389,796. Patented Sept. 18, 1888.
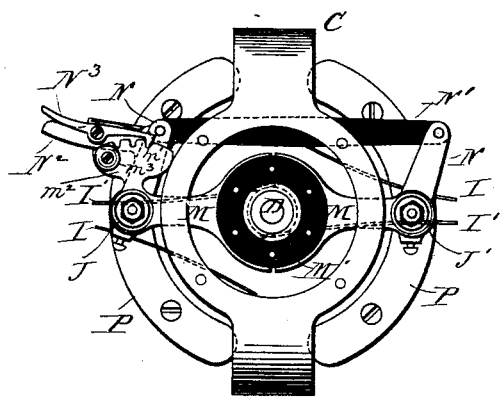
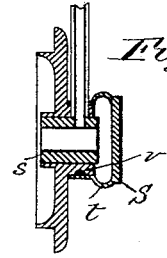
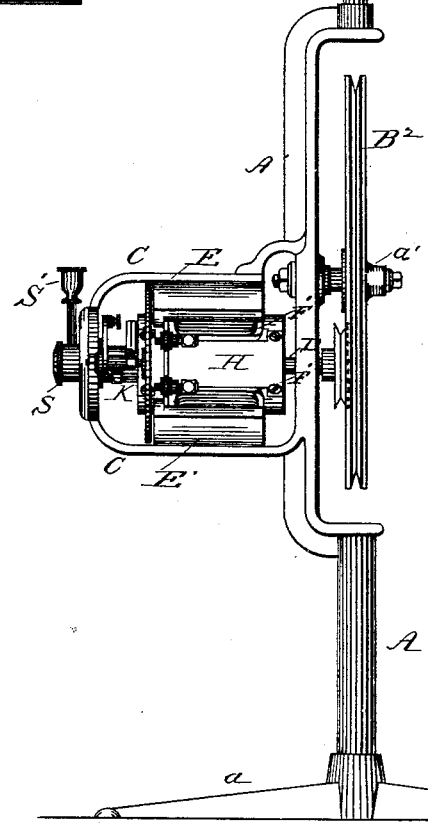
WITNESSES
INVENTOR (No Model.) 3 Sheets—Sheet 3.
C. DORIOT.
DENTAL ENGINE.
No. 389,796. Patented Sept. 18, 1888.
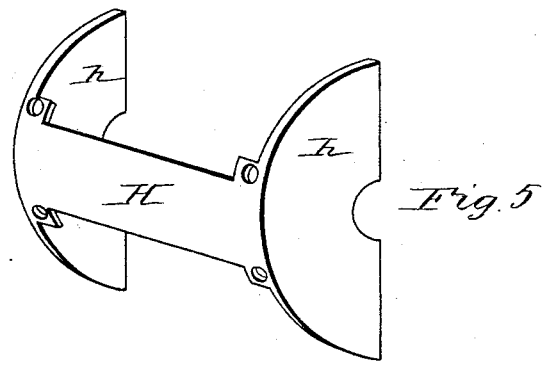
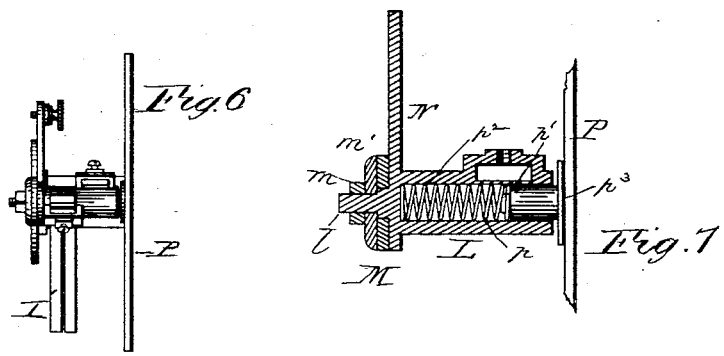
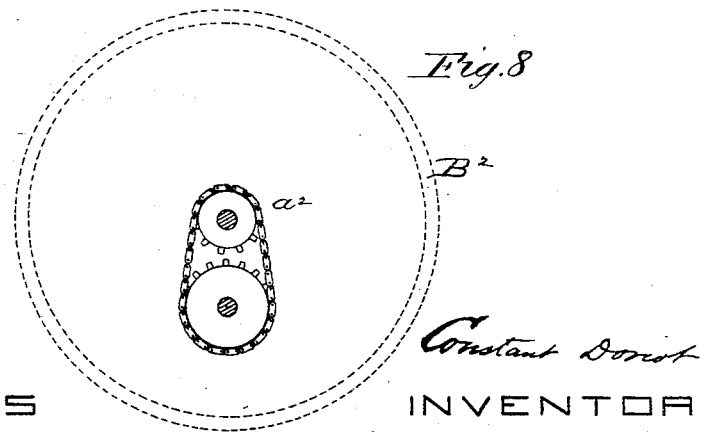
WITNESSES
INVENTOR
Constant Doriot

UNITED STATES PATENT OFFICE.

CONSTANT DORIOT, OF PHILADELPHIA, PENNSYLVANIA.

DENTAL ENGINE.

SPECIFICATION forming part of Letters Patent No. 389,796, dated September 18, 1888.

Application filed February 18, 1887. Serial No. 228,078. (No model.)

*To all whom it may concern:*

Be it known that I, CONSTANT DORIOT, a citizen of the Republic of France, residing at Philadelphia, in the county of Philadelphia and State of Pennsylvania, have invented certain new and useful Improvements in Dental Engines; and I do hereby declare the following to be a full, clear, and exact description of the invention, reference being had to the accompanying drawings, which form part of this specification.

This invention has relation to certain improvements in dental engines, and has for its object the provision of means whereby a dental engine may be operated by means of an electromotor, and the provision of novel features in an electromotor whereby the usual flexible connections between the commutator-brushes and the motor are dispensed with, and whereby the adjustment of the brushes and the reversion of the current through the motor may be effected in a convenient and expeditious manner.

My invention accordingly consists, first, in the combination, with the upright frame of a dental engine, of a laterally-projecting skeleton frame and an electromotor attached to and supported within said skeleton frame; second, in the novel construction and combination of devices for leading the current through the brushes and commutator from and to the motor without the use of flexible connections, as hitherto employed, while permitting said brushes to be shifted or reversed; third, in the combination, with the body of an electric motor, of certain devices by means of which the action of the motor is rendered silent, and by which the pole-pieces of the field are braced against undue expansion and contraction and the armature and interior parts protected from dust, &c.; fourth, in certain details of construction, as hereinafter described and specifically claimed.

In the accompanying drawings, Figure 1 is a front elevation of a dental engine embracing my improvements. Fig. 2 is a side elevation of the same. Fig. 3 is a face view of the motor with end cap removed. Fig. 4 is a vertical central section of the bearing-cap. Fig. 5 is a perspective view of one of the noise-deadeners. Fig. 6 is a detail view of one of the brush-holders and connections. Fig. 7 is a section of one of the brush-holders. Fig. 8 is a detail view showing connection between motor and fly-wheel.

A designates the vertical cast-iron standard or upright of a dental engine constructed and adapted to the requirements of the several features of my invention, and having the feet or supports $a\, a\, a$.

B designates the treadle, B' the pitman, and $B^2$ the grooved fly or pulley wheel from which motion is conveyed to the flexible shaft of the engine. The wheel $B^2$ is of the usual size and shape, and is supported by a short horizontal spindle fitted and secured to the upright A in any appropriate manner. The hub $a'$ of the wheel $B^2$ is elongated, and has keyed to it on the inner face of the wheel $B^2$ a smaller wheel, $a^2$, which may be either a toothed gear-wheel, engaging through an idler with a gear-wheel on the shaft of the electromotor, or a sprocket-wheel, as shown in Fig. 8, coupled by a chain with a similar wheel on the end of the electromotor-shaft.

For the purposes of my invention the toothed gearing and chain and sprocket wheels or pulleys and belts may be considered equivalents of each other.

The pitman B' may be connected and disconnected from the crank-arm on the wheel $B^2$, so as to allow the motor to run independently of the treadle, and for this purpose the eye portion of the pitman is provided with an adjustable slotted closing-plate, by shifting which the eye may be opened and the pitman unhooked from the crank-pin.

To accommodate the electromotor, the frame or standard of the engine is cast with or has secured thereto an offset or skeleton frame, C, of substantially rectangular form, which projects from one side of the standard, and which at its outer end is so widened and otherwise shaped as to afford a bearing for the outer end of the horizontal shaft D of the armature, the bearing for the inner end being in the standard A, the latter being cast with a ribbed lateral offset at A', to accommodate the fly-wheel and bring it in line with the upper portion of the standard.

The upper and lower horizontal bars of the frame C are adapted to support the curved yokes E E', to which are secured the cores of the field-magnets F F, of which there are two above and two below the armature, on opposite sides, respectively, of a vertical diametrical line. The field-magnets are wound in the usual way, and their cores carry the enlarged segmental pole-pieces F' F', whose inner surfaces are concentric with the armature.

The armature is or may be of the usual Siemens type, and requires no specific mention.

Rotary armatures are usually noisy in their action, owing to the friction and compression of the air. In order to avoid this noise, as well as to protect the cavity of the motor from the entrance of dust or other particles, I employ what I term "silence-plates," which are shown at H H, and which consist of curved brass plates bolted or attached by screws on either side of the motor to the upper and lower pole-pieces. These plates extend the whole length of the pole-pieces, and at their ends are formed or provided with semicircular caps $h\,h$, which, when brought together, entirely close and cover the cavity between the pole-pieces, in which the armature rotates. The air is thus prevented from being drawn in and forced out by the action of the armature, and the usual disagreeable noise and humming prevented or greatly diminished.

The plates H H, in addition to their service as protecting devices, serve also as strengthening-braces between the pole-pieces, preventing the latter from being unduly affected by the expansion and contraction which they tend to undergo under magnetic influence, heat, &c. The semicircular end parts, $h\,h$, are recessed at the middle of their inner edges, to embrace the armature shaft and permit of their being brought into close contact.

I I' designate the commutator-brushes, and J J' the brush-holders. The commutator K is divided into two sections, and the brushes are adapted and designed to contact in pairs alternately, according to the direction it is desired to run the current and drive the armature. For this purpose there are two distinct sets of brushes, one set—i. e., two brushes, I I or I' I'—being in contact with the commutator, while the other two are out of contact. The brush-holders proper are the approximately cylindrical blocks or bars J J', which are pivotally attached to the opposite ends, respectively, of a frame, M, the latter being secured to an insulated collar, M', which encircles the armature-shaft and partly rotates thereon. The brush-holders J J' are secured to the frame M by means of the threaded bosses $l\,l$, passing through holes in the ends of the frame M, and holding nuts $m$, resting on washers $m'$. Each brush-holder carries two brushes properly secured in slots and projecting at different angles—that is, they diverge at their inner ends—so that while one is in contact with the commutator the other will be out of contact, as shown. From each brush-holder an arm, N, extends upwardly, and is pivotally connected to a horizontal bar, N', of rubber or other non-conducting material, by the movement lengthwise of which both brush-holders will be turned simultaneously and the brushes shifted so as to make contact through two or throw out of contact all the brushes with the commutator. To afford a means of locking the brushes in any desired position, one of the arms N is formed or provided with a lateral extension, $N^2$, to which is pivoted a spring latch or dog, $N^3$, having a tooth, $n'$, at its inner end, while the frame M has at one end a vertical extension, $m^2$, in the form of a segmental toothed plate, with the teeth or notches of which the dog or latch is caused to engage, according to the position to which the brushes are adjusted with reference to the commutator. An insulated knob, $m^3$, secured to the plate $m^2$ affords a means for grasping and manipulating the frame M and its connections.

The frame M is made adjustable, so that the brushes, after any change in their relation, may be further adjusted upon the commutator-sections—that is, projected farther inward or outward.

Electric connection between the brushes or brush-holders and the motor-magnets is made through the non-magnetic segmental plates P P, which are secured to the pole-pieces of the field-magnets. The outer surfaces of these plates are made as true, even, and smooth as possible and the wires from the motor connected to their inner sides. To make contact with these plates, each brush-holder is formed with a longitudinal shouldered socket, $p$, in which is loosely fitted a pin, $p'$, tenoned and encircled by a spiral spring, $p^2$. The outer end of the pin is enlarged, and is in the form of a flat disk or head, $p^3$, which rests upon and against the outer surface of plate P, and is held in close contact therewith by the expansive power of the spring $p^2$. These expedients, while maintaining a perfect electric contact between the brush-holders and plates P P, allow the former to be shifted to meet any required adjustment and entirely supersede the use of the usual flexible wire connections.

As shown in Fig. 4, the armature-shaft has its outer bearing in a bushing, $s$, fitted in the frame C, and projects through the same into a cylindrical lubricating box or case, S, which carries an oil-cup, S'. The interior of this box or case is circumferentially grooved, as shown at $t$, to receive the drippings from the shaft and prevent the surplus oil from reaching the commutator, brushes, or other portions which it is necessary to keep clean. The boss $v$, in which the bushing $s$ has its seat, should also be similarly grooved for the same purpose.

What I claim as my invention is as follows:

1. The combination, with the upright frame or standard of a dental engine having journaled thereto the fly or pulley wheel $B^2$, of an electromotor attached to and supported upon said frame on a horizontal axis, and having its armature-shaft connected to said fly-wheel or pulley through intermediate connections, substantially as described.

2. The combination, with the upright frame or standard of a dental engine having a laterally-projecting skeleton frame cast integral therewith, of an electromotor attached to and supported within said frame, substantially as described.

3. In an electromotor, the combination, with the field-magnets having segmental circuit-plates attached to one end, of an adjustable frame mounted on the armature-shaft, contact-brush holders attached to said frame, tubular sockets formed on said holders, headed plugs fitted in said sockets and bearing against said circuit-plates, and springs fitted in said sockets and bearing against said plugs, substantially as described.

4. In an electromotor, the combination, with the commutator and brushes, of the brush-holders, the spring contact-plugs attached thereto, and the conducting-plates, against which said plugs impinge and upon which the brush-holders are adjustable, substantially as described.

5. In an electromotor, the combination, with the pole-pieces of the field-magnets, of non-magnetic plates secured thereto, and having semicircular end plates which close the ends of the armature-cavity, substantially as described.

In testimony that I claim the foregoing I have hereunto set my hand this 24th day of January, 1887.

CONSTANT DORIOT.

Witnesses:
WILL H. POWELL,
R. DALE SPARHAWK.